US011986945B2

(12) United States Patent
Samsel et al.

(10) Patent No.: US 11,986,945 B2
(45) **Date of Patent: *May 21, 2024**

(54) WORK SITE LID HANGER STORAGE SYSTEM

(71) Applicant: APEX BRANDS, INC., Apex, NC (US)

(72) Inventors: Richard A. Samsel, Haines City, FL (US); Matthew Poppe, Holly Springs, NC (US); Andrew Speciale, Raleigh, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,621

(22) Filed: Apr. 18, 2022

(65) Prior Publication Data

US 2022/0266443 A1 Aug. 25, 2022

Related U.S. Application Data

(63) Continuation of application No. 16/896,350, filed on Jun. 9, 2020, now Pat. No. 11,364,618.

(60) Provisional application No. 62/859,465, filed on Jun. 10, 2019.

(51) Int. Cl.
*B25H 3/02* (2006.01)
*B25H 3/00* (2006.01)

(52) U.S. Cl.
CPC ............... *B25H 3/023* (2013.01); *B25H 3/00* (2013.01); *B25H 3/022* (2013.01); *B25H 3/028* (2013.01)

(58) Field of Classification Search
CPC .. B25H 3/023; B25H 3/02; B25H 3/00; A47B 81/00
USPC ........................................................ 206/379
See application file for complete search history.

(56) References Cited

U.S. PATENT DOCUMENTS

| | | | | |
|---|---|---|---|---|
| 4,288,134 | A | 9/1981 | Knaack et al. | |
| 8,342,580 | B2 | 1/2013 | Cowie et al. | |
| 11,364,618 | B2 * | 6/2022 | Samsel | B25H 3/022 |
| 2006/0163981 | A1 * | 7/2006 | Conrad | E06B 3/5045 312/323 |
| 2016/0161177 | A1 * | 6/2016 | Bond | A45C 11/20 220/735 |
| 2017/0190472 | A1 | 7/2017 | Milburn | |
| 2018/0345478 | A1 * | 12/2018 | Grela | B25H 3/06 |

* cited by examiner

*Primary Examiner* — Robert J Hicks
*Assistant Examiner* — Sanjidul Islam
(74) *Attorney, Agent, or Firm* — Burr & Forman LLP

(57) ABSTRACT

A tool chest may include a base portion, two opposing sidewalls and a foldable lid. The sidewalls extend to define a tool repository therebetween. The lid has a closed position covering a top of the tool chest and at least a part of a front of the tool chest, and an open position in which both the top of the tool chest and the part of the front of the tool chest are open to provide access to the tool repository. The lid comprises a top section, an overhang portion and a front section. The top section extends perpendicular to the top section. The front section extends substantially parallel to the overhang portion in the closed position and substantially perpendicular to the overhang portion in the open position. A hanger space is formed between the front portion and the top portion when the lid is in the open position.

10 Claims, 11 Drawing Sheets

WORK SITE LID HANGER STORAGE SYSTEM

CROSS-REFERENCE TO RELATED APPLICATIONS

This application is a continuation of U.S. application Ser. No. 16/896,350 filed on Jun. 9, 2020, which claims benefit to U.S. provisional application No. 62/859,465 filed on Jun. 10, 2019, the entire contents of which are hereby incorporated by reference.

TECHNICAL FIELD

Example embodiments generally relate to containers for storing tools and, in particular, relate to a tool chest having a hanger system disposed at its lid.

BACKGROUND

Tool chests are familiar sights from worksites to garages. The tool chest allows tools to be stored in an organized way, but also typically provides the ability to store the tools in a secure manner. Given the cost, mobility and utility of hand tools and power tools, the ability to securely store the tools can be very important.

However, equally important to many tool owners is the efficient use of space within a tool chest. Tool chests can be large, and may take up a lot of space and/or be relatively heavy. Accordingly, given that the tool chest will be taking up space at a work site, in a truck, garage or workshop, tool chest owners expect to get as much space as possible within the tool chest for actual and effective tool storage.

Tool chests that make innovative and efficient use of internal space may be seen to have desirable features that can create big advantages with respect to demand in the marketplace. Thus, it may be desirable to develop innovative ways to make use of the space in a tool chest, and particularly in unique spaces that are created by virtue of opening the tool chest.

BRIEF SUMMARY OF SOME EXAMPLES

Some example embodiments may enable the provision of a tool chest that includes structures designed to make efficient use of a unique space that is created when opening a certain type of tool chest (i.e., a piano box tool chest).

In an example embodiment, a tool chest is provided. The tool chest may include a base portion, two opposing sidewalls and a foldable lid. The sidewalls extend substantially parallel to each other on opposite sides of the base portion to define a tool repository between the sidewalls. The lid has a closed position covering a top of the tool chest and at least a part of a front of the tool chest, and an open position in which both the top of the tool chest and the part of the front of the tool chest are open to provide access to the tool repository. The lid comprises a top section, an overhang portion and a front section. The top section is rigidly attached to the overhang portion such that the overhang portion extends perpendicular to the top section. The front section is hingedly attached to the overhang portion such that the front section extends substantially parallel to the overhang portion in the closed position and substantially perpendicular to the overhang portion in the open position. A hanger space is formed between the front portion and the top portion when the lid is in the open position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
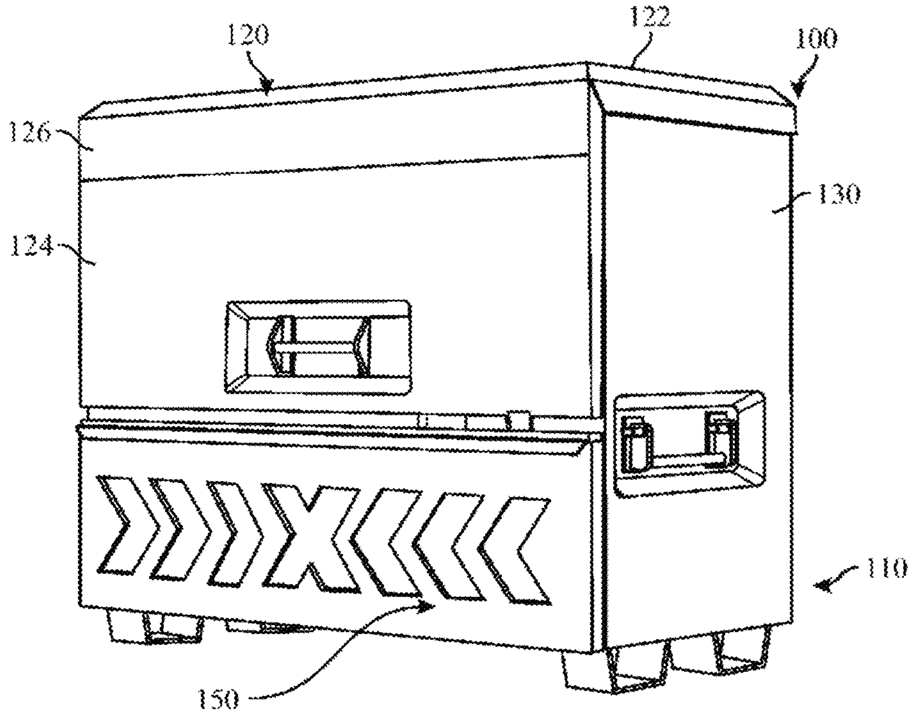
FIG. 1 illustrates a front perspective view of a tool chest with lid closed according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a hanger system that can convert previously non-useful space that is created when the lid of a piano box type tool chest is opened into valuable space for hanging items. The efficiency and utility of the tool chest may therefore be improved.

Referring first to FIGS. 1-19 a tool chest 100 according to the first example embodiment is provided having a base portion 110, a lid 120, a first sidewall 130, a second sidewall 140, and a drawer portion 150, which is optional. Thus, example embodiments may also be employed on models that do not include any drawer. The lid 120 may be operably coupled to a back panel of the tool chest 100 (e.g., extending between the first and second sidewalls 130 and 140) via a hinge assembly disposed at the intersection of the back panel and the lid 120. In some cases, the lid 120 may include top section 122 and a front section 124. The top section 122 and front section 124 may be operably coupled to each other by another hinge assembly such that, when the lid is opened, the top section 122 rotates about 90 degrees from a horizontal position to a nearly vertical position (in some cases just slightly past vertical) while the front section 124 pivots relative to the top section 122 so that the front section 124 can essentially remain oriented vertically.

Figure 2:
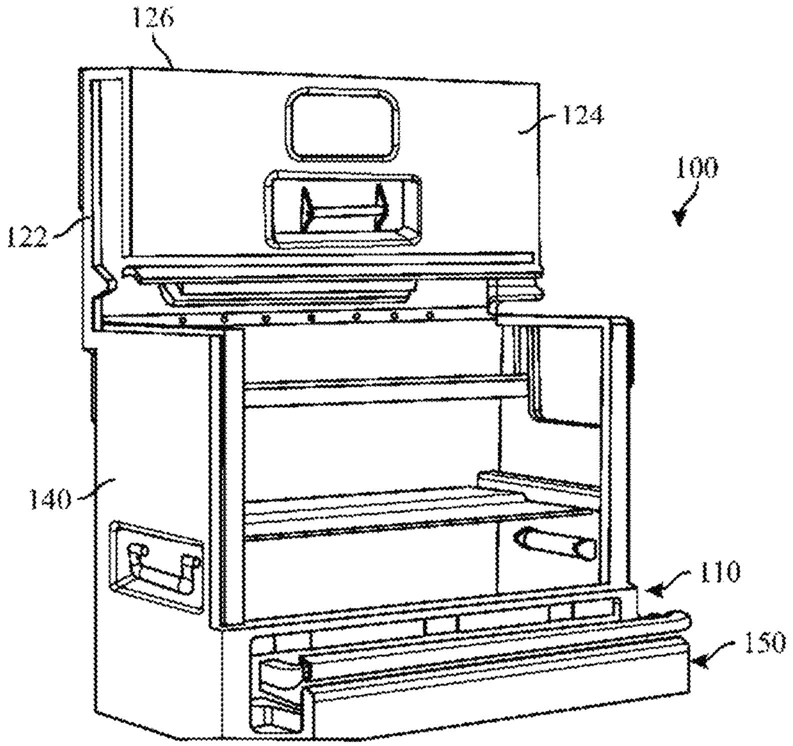
FIG. 2 illustrates a front perspective view of the tool chest with the lid open according to an example embodiment.

The top section 122 may include an overhang portion 126 that extends at about a 90 degree angle with respect to the rest of the top section 122. The overhang portion 126 therefore extends in-line with the front section 124 (i.e., vertically) when the lid 120 is closed (as shown in FIG. 1) and extends substantially perpendicular to the front section (124) and substantially horizontally when the lid 120 is open (as shown in FIG. 2).

Figure 3:
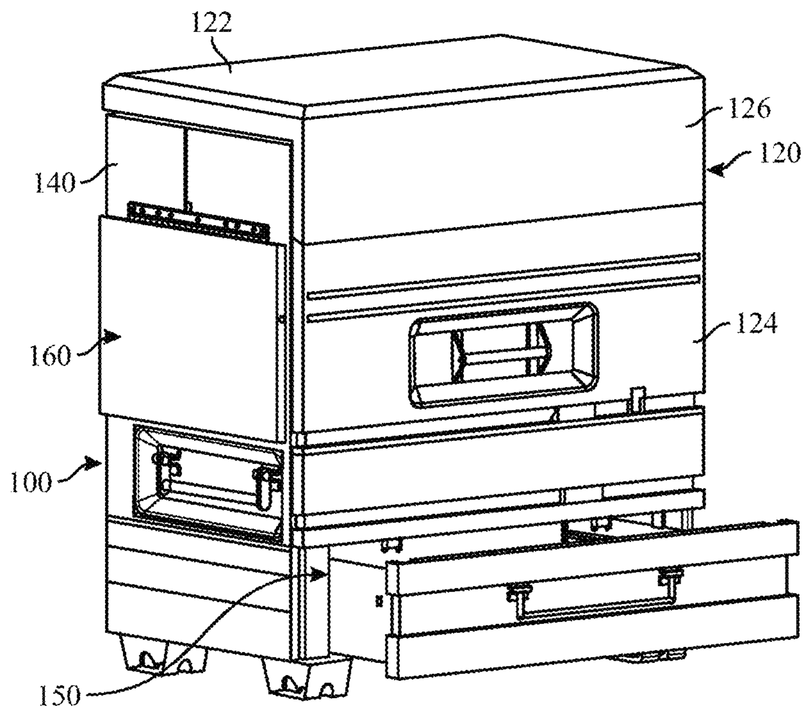
FIG. 3 is a front perspective view of the tool chest with the lid closed, and drawer open according to an example embodiment.
Figure 4:
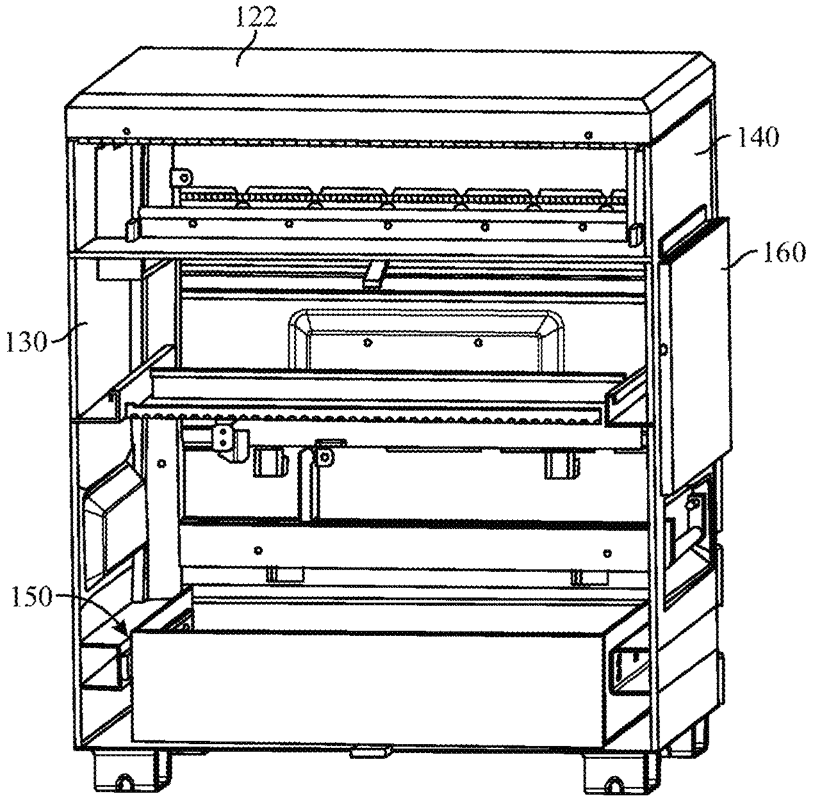
FIG. 4 illustrates a rear perspective view of the tool chest with the a back portion of the tool chest removed to expose some internal components on the front portion of the tool chest according to an example embodiment.

The drawer portion 150 can be embodied in different ways. FIG. 2 illustrates one embodiment of the drawer portion 150, and FIG. 3 illustrates a second embodiment for the drawer portion 150. The example of FIG. 3 also illustrates a folding work table 160 that may be attached to one of the sidewalls such as the second sidewall 140 in this example.

Figure 5:
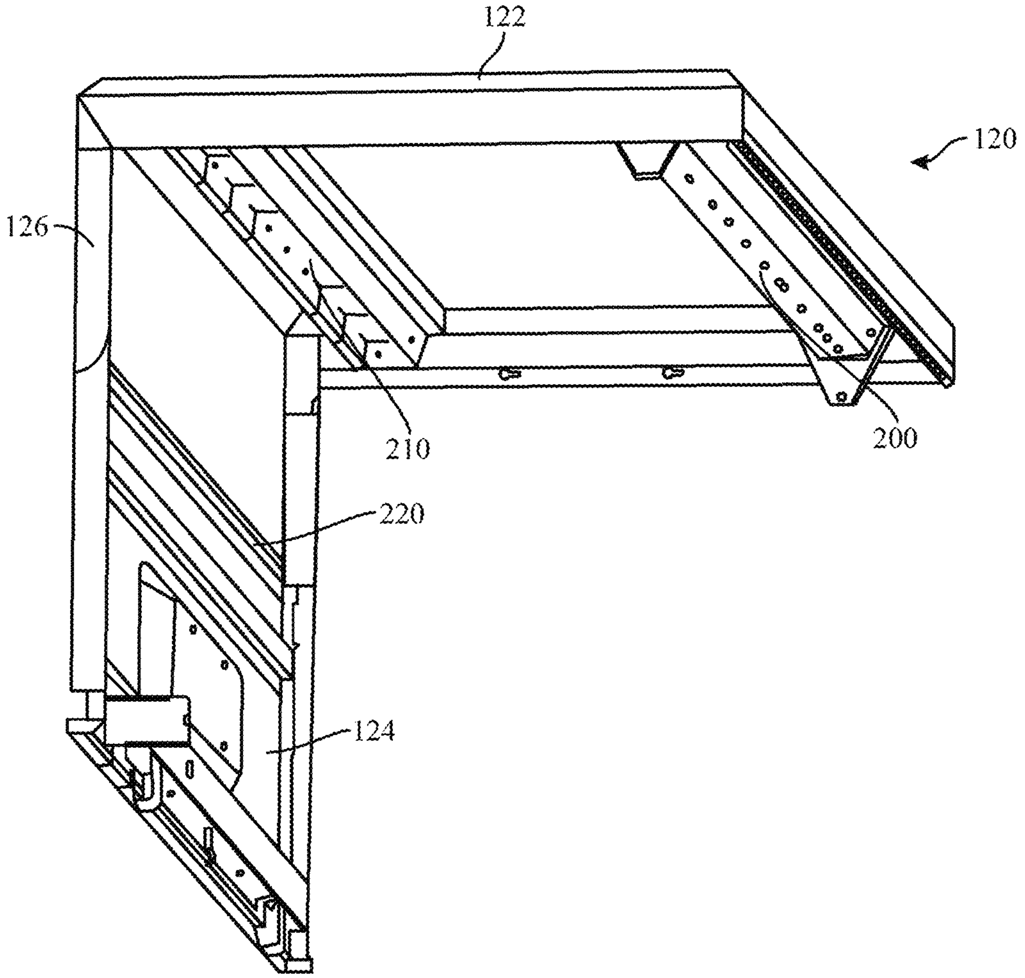
FIG. 5 illustrates an isolated perspective view of an internal portion of the lid in its closed position according to an example embodiment.
Figure 6:
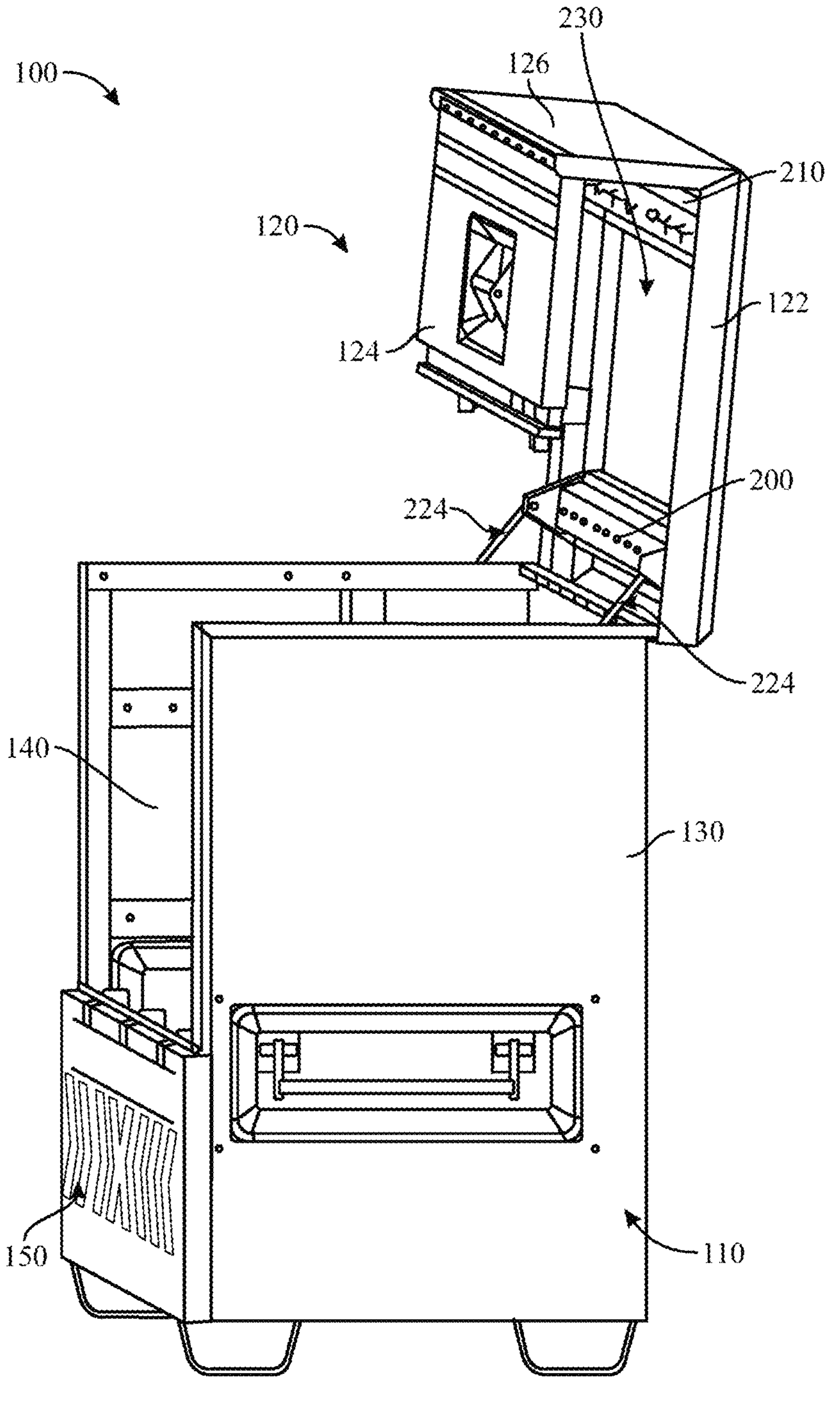
FIG. 6 illustrates a side perspective view of the tool chest with the lid open to illustrate a storage space created by opening the lid according to an example embodiment.
Figure 7:
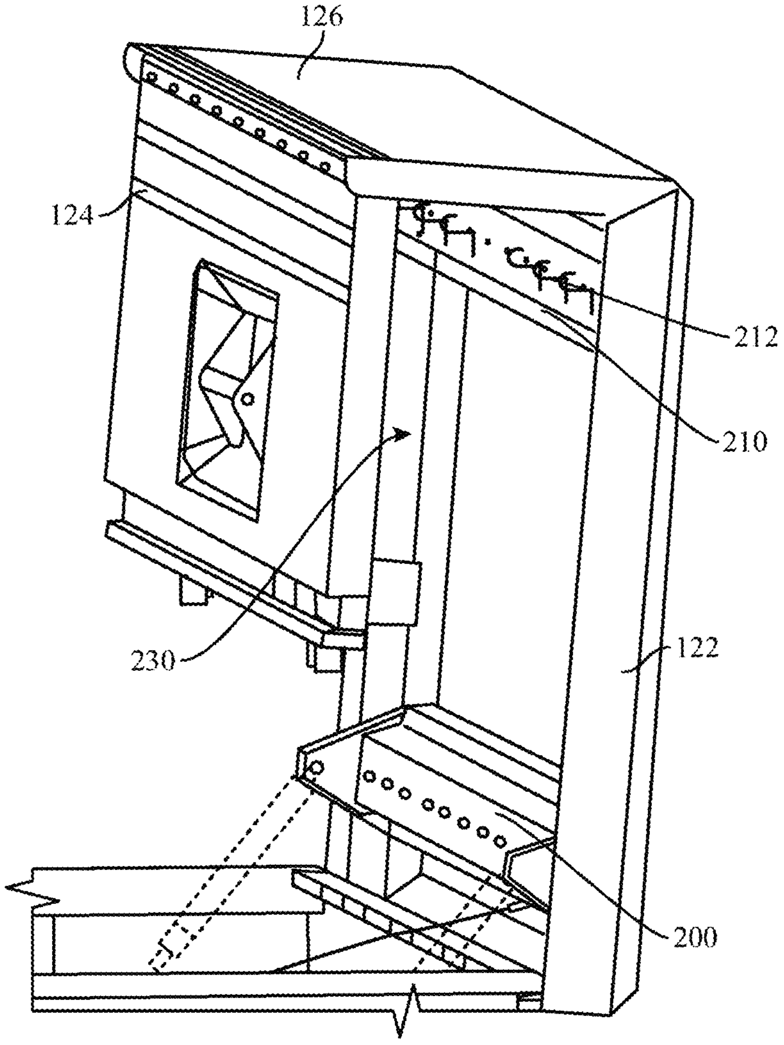
FIG. 7 is a closer side perspective view of the tool chest of FIG. 6 according to an example embodiment.
Figure 8:
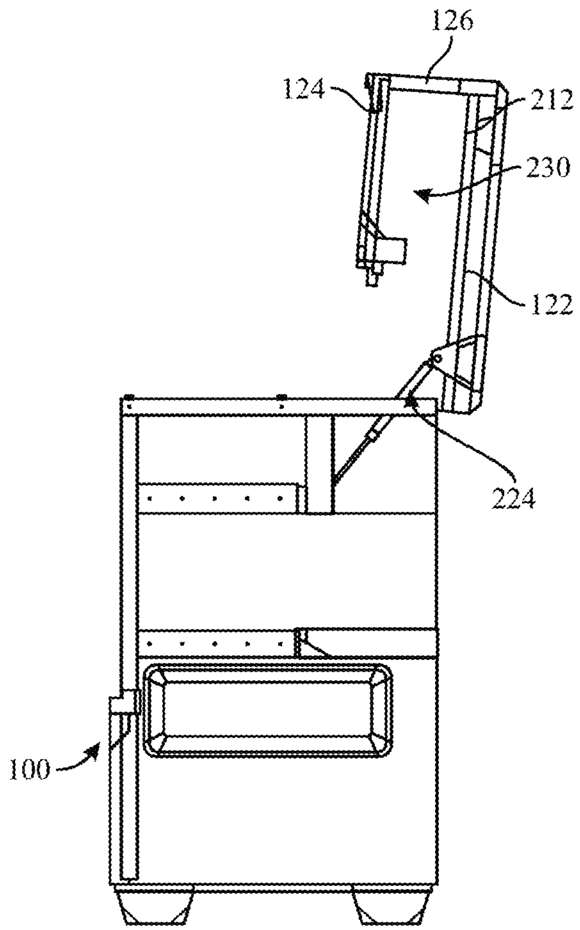
FIG. 8 illustrates a partially cutaway side view of the tool chest with the lid open according to an example embodiment.
Figure 9:
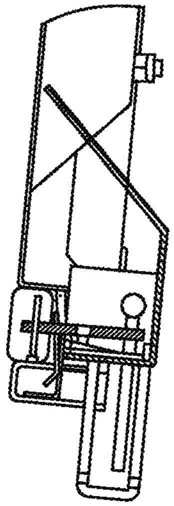
FIG. 9 is a cross section view of a portion of the tool chest of FIG. 8 according to an example embodiment.
Figure 10:
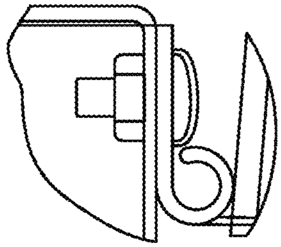
FIG. 10 is a detailed side view of a portion of the tool chest of FIG. 8 according to an example embodiment.
Figure 11:
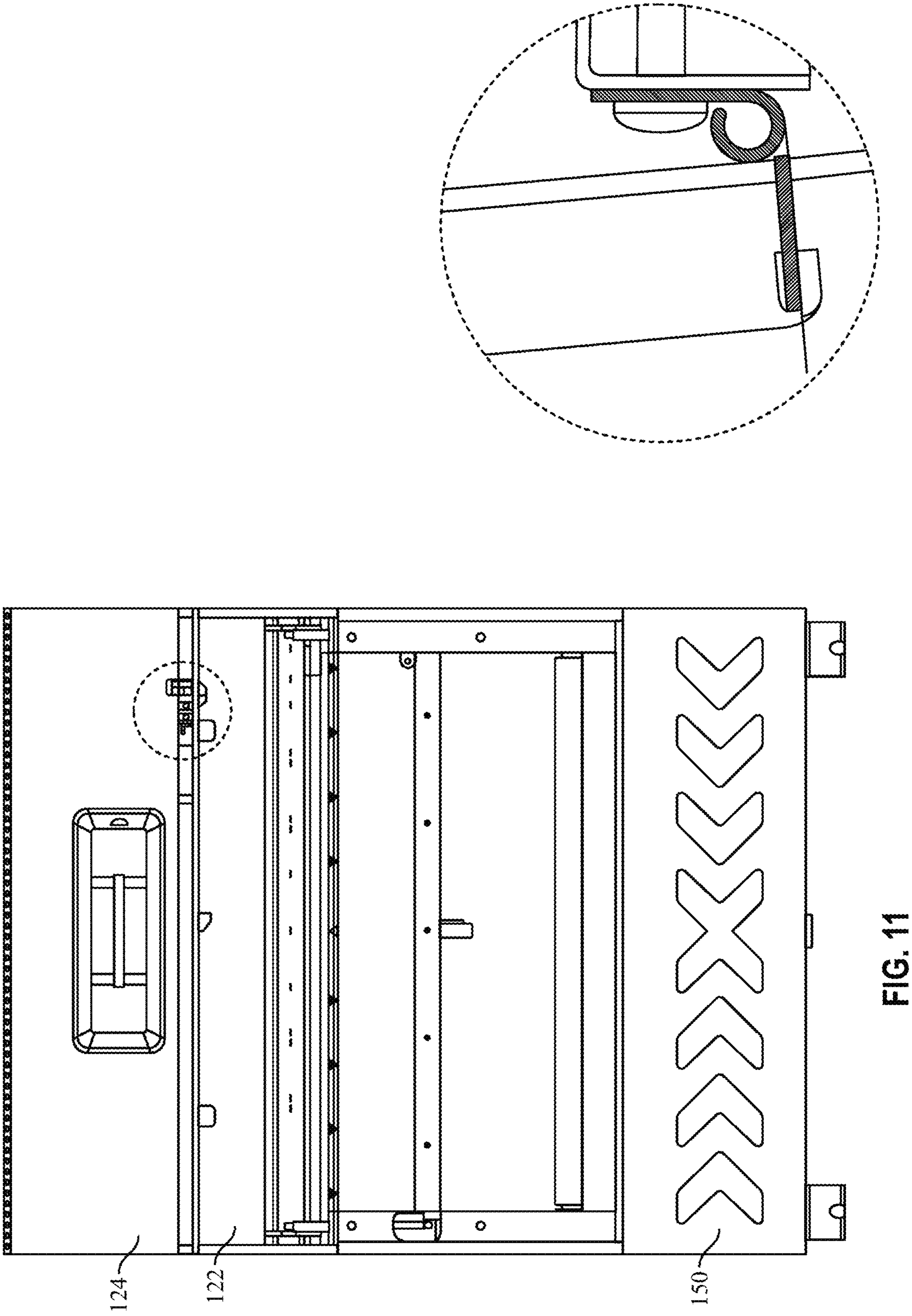
FIG. 11 illustrates a front view of the tool chest with the lid open according to an example embodiment.

FIG. 5 illustrates an isolated perspective view of an internal portion of the lid 120 in the closed position according to an example embodiment. As shown in FIG. 5, the top section 122 of the lid 120 may include structural supports (i.e., bolsters) that are configured to extend laterally across the top section 122. At a rear portion of the lid 120 (i.e., proximate to the hinge assembly and the back panel) a hinge bolster 200 may be provided to extend across the top section 122. Meanwhile, at the front portion of the lid 120), a hanger support bolster 210 may be provided to extend across the top section 122 parallel to the hinge bolster 200. As can be appreciated from FIG. 5, when the lid 120 is closed, the hanger support bolster 210 and the hinge bolster 200 may each lie (or extend downward out of) a same, horizontal plane. Meanwhile, both the overhang portion 126 and the front section 124 extend downwardly from the top section 122 in a vertical plane. FIG. 5 also shows the hinge assembly 220 that operably couples the front section 124 to the overhang portion 126.

Figure 12:
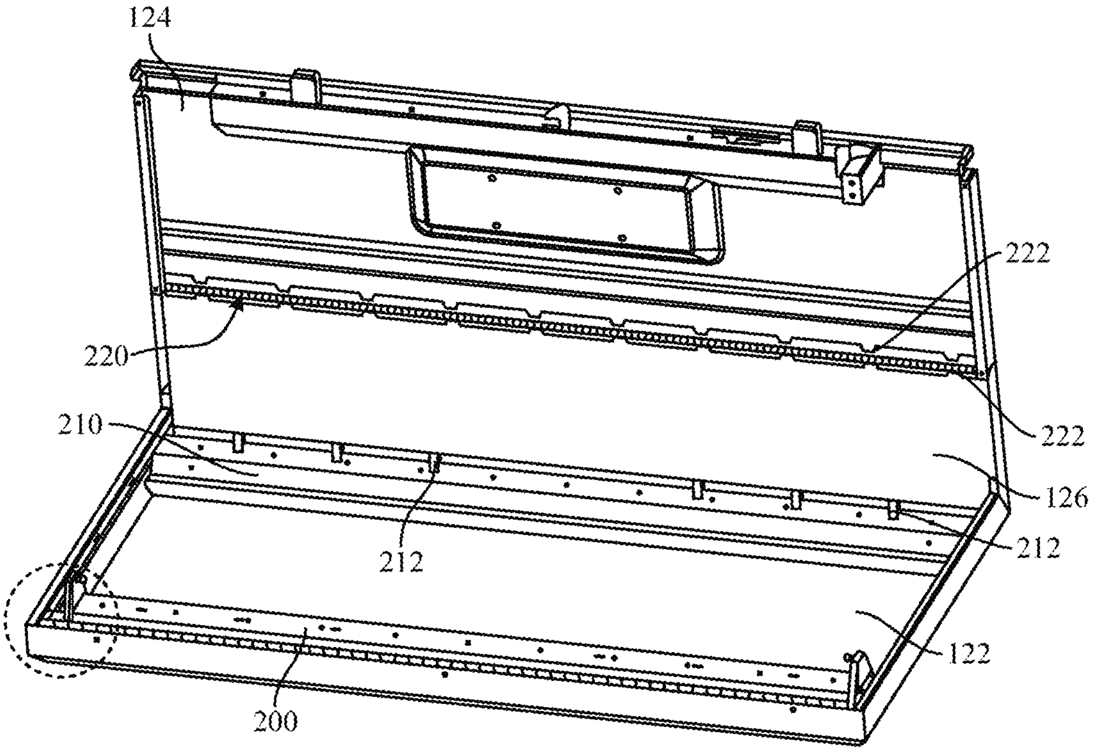
FIG. 12 illustrates another isolated perspective view of the inside of the lid according to an example embodiment.
Figure 13:
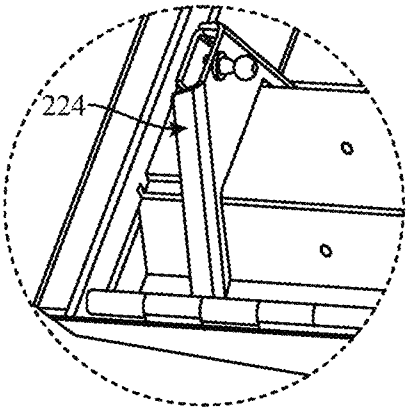
FIG. 13 is a perspective view of gas shocks used to facilitate operation of the lid according to an example embodiment.

As shown in FIG. 12, the hinge assembly 220 may be notched hinge having a plurality of notches 222 disposed along its length. The operation of the hinge assembly 220 may be facilitated by one or more gas shocks 224 that may be operably coupled between the hinge bolster 200 (i.e., at respective opposite ends thereof) and respective top portions of the first and second sidewalls 130 and 140, respectively.

When the lid 120 is transferred to the open position, as shown in FIGS. 6-8 and 11, a hanger space 230 is formed. The hanger space 230 is bounded on a back side by the top section 122, bounded at a top side by the overhang portion 126, and bounded at a front side by the front section 124. Lateral sides and a bottom side of the hanger space 230 are open.

Figure 14:
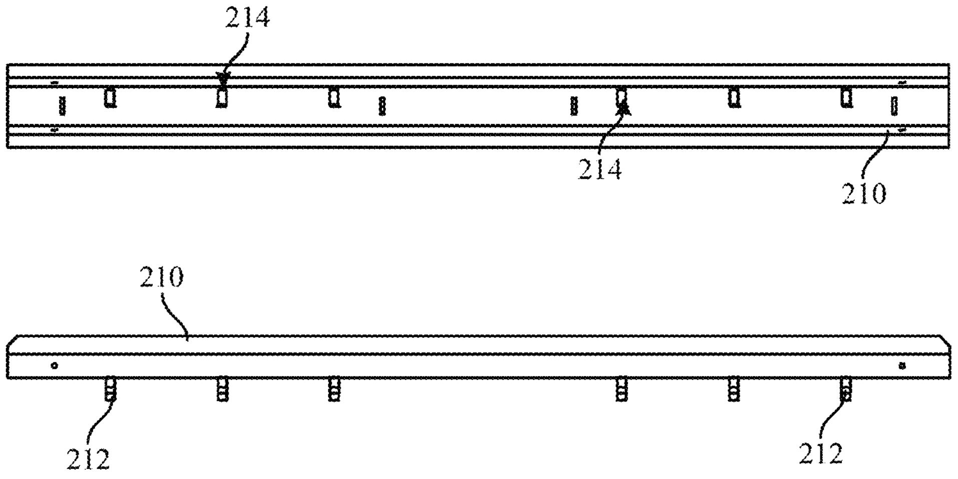
FIG. 14 illustrates front and side views of a bolster having slots for harness hooks according to an example embodiment.
Figure 15:
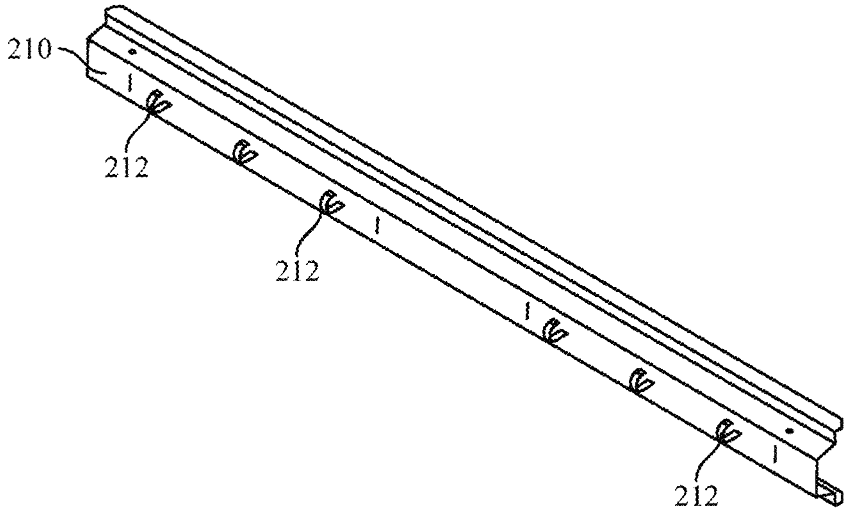
FIG. 15 illustrates a perspective view of the bolster with harness hooks according to an example embodiment.
Figure 16:
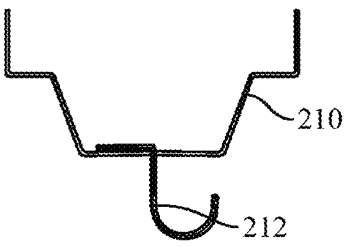
FIG. 16 illustrates a side view of a harness hook in a slot of the bolster according to an example embodiment.

This hanger space 230 may typically be wasted space. However, example embodiments may employ a series of harness hooks 212 that may be disposed in the hanger support bolster 210 spaced apart from each other. The harness hooks 212 may be disposed in slots 214 cut or punched in the hanger support bolster 210 to provide openings into which a portion of the harness hooks 212 can be fed to be retained therein. The slots 214 are best shown in FIG. 14, and FIGS. 15 and 16 illustrate the harness hooks 212 disposed in the slots 214.

Figure 17:
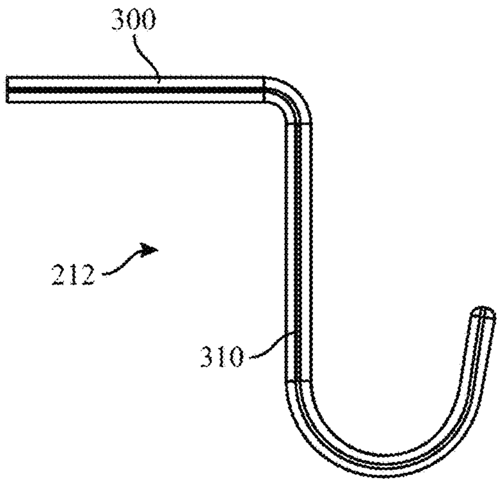
FIG. 17 illustrates a side view of a harness hook according to an example embodiment.
Figure 18:
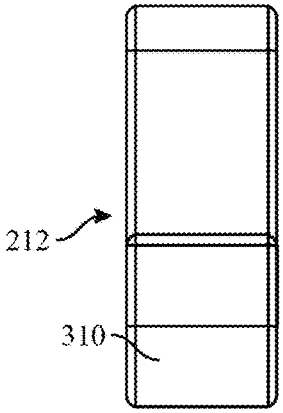
FIG. 18 illustrates front view of a harness hook according to an example embodiment.
Figure 19:
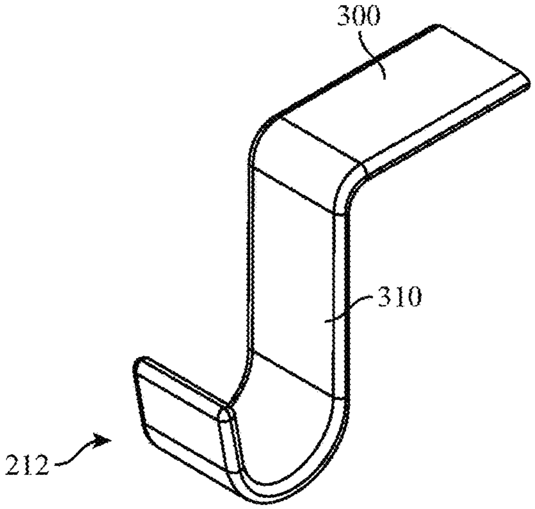
FIG. 19 is a perspective view of the harness hook according to an example embodiment.

Details of the structure of the harness hooks 212 of an example embodiment are shown in FIGS. 17-19. In this regard, the harness hooks 212 may include an insertion tab 300 that is inserted into one of the slots 214. A hook portion 310 may extend perpendicularly away from the insertion tab 300 (i.e., such that the hook portion 310 and the insertion tab 300 intersect each other at about a 90 degree angle). The hook portion 310 may be bent upward (i.e., forward and toward a plane in which the insertion tab 300 lies) at its distal end (relative to the intersection with the insertion tab 300).

Figure 20:
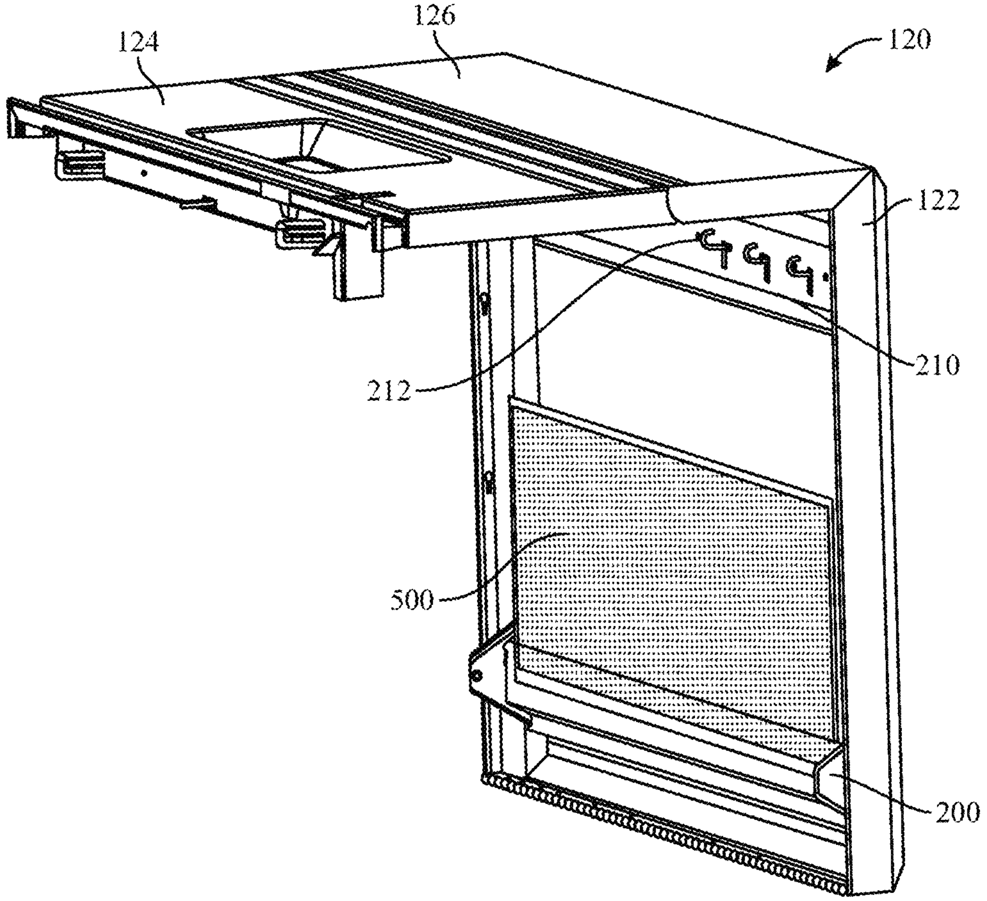
FIG. 20 illustrates a view of the tool chest having a net in accordance with an example embodiment.

As can be appreciated from the descriptions above, the hanger space 230 forms a protected area for storing objects. An example of such objects may include safety harnesses or other things that are amenable to being suspended from the harness hooks 212. If safety harnesses are employed, or other objects for which prevention of parts of the object getting stuck on other objects or parts of or in the tool chest 100 is desirable due to the dangling nature of some part of the object, it may be desirable to further employ a net. FIG. 20 illustrates the tool chest with a net 500 to retain lower straps of a harness or other dangling portions of an object. In some cases, particularly when the lid 120 is closed, the straps of the objects or harness may be retained by the net 500 from dangling down in to the tool receptacle area of the tool chest 100. The objects can be hung in and/or removed from the hanger space 230 by reaching around the front section 124. However, the front section 124 could also be temporarily lifted to hang or retrieve an object, and then the front section 124 could again be allowed to hang naturally and protect the object from the front side. Meanwhile all other contents of the tool chest 100 may be accessible through the opening created by opening the lid 120 (and/or via the drawer portion 150). Thus, maximum utilization of the space in the tool chest 100 may be achieved.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tool chest comprising:

a base portion;

two opposing sidewalls extending substantially parallel to each other on opposite sides of the base portion to define a tool repository between the sidewalls; and a foldable lid that has a closed position covering a top of the tool chest and at least a part of a front of the tool chest, and an open position in which both the top of the tool chest and the part of the front of the tool chest are open to provide access to the tool repository, wherein the lid comprises a top section, an overhang portion and a front section, wherein the top section is rigidly attached to the overhang portion such that the overhang portion extends perpendicular to the top section, wherein the front section is hingedly attached to the overhang portion such that the front section extends substantially parallel to the overhang portion in the closed position and substantially perpendicular to the overhang portion in the open position, wherein a hanger space is formed between the front section and the top section when the lid is in the open position, wherein the top section includes a hanger support bolster, and wherein the hanger support bolster is disposed adjacent to an intersection of the overhang portion and the top section, proximate to each of the sidewalls when the lid is in the closed position, and approximately a length of the top section away from the sidewalls when the lid is in the open position.

2. The tool chest of claim 1, wherein a length of the overhang portion measured between the top section and the front section is greater than approximately 25% of a length of the front section such that the hanger space is at least 25% as long as the front section when the lid is in the open position.

3. The tool chest of claim 1, wherein one or more gas shocks extend between the top section of the lid and a corresponding one or more of the sidewalls.

4. The tool chest of claim 1, wherein the top section includes one or more hooks.

5. The tool chest of claim 4, wherein the one or more hooks are configured to retain a hanging item thereon in the hanger space when the lid is in the open position and between the sidewalls when the lid is in the closed position.

6. The tool chest of claim 4, wherein the one or more hooks are fixedly operably coupled to the hanger support bolster.

7. The tool chest of claim 1, wherein a net is operably coupled to the top section to retain an object proximate to the top section in the hanger space.

8. The tool chest of claim 7, wherein the net retains the object in the hanger space when the lid is in the open position and between the sidewalls when the lid is in the closed position.

9. The tool chest of claim 7, wherein the net is spaced apart from the hanger support bolster.

10. The tool chest of claim 7, wherein the net is disposed to cover a bottom half of the top section when the lid is in the open position.

* * * * *